(12) United States Patent
Kitagishi

(10) Patent No.: US 10,300,768 B2
(45) Date of Patent: May 28, 2019

(54) STRUCTURE FOR ATTACHING BLOCKING MEMBER

(71) Applicant: DENSO CORPORATION, Kariya, Aichi-pref. (JP)

(72) Inventor: Seiichirou Kitagishi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 398 days.

(21) Appl. No.: 15/303,955

(22) PCT Filed: Apr. 7, 2015

(86) PCT No.: PCT/JP2015/001953
§ 371 (c)(1),
(2) Date: Oct. 13, 2016

(87) PCT Pub. No.: WO2015/162863
PCT Pub. Date: Oct. 29, 2015

(65) Prior Publication Data
US 2017/0036518 A1    Feb. 9, 2017

(30) Foreign Application Priority Data

Apr. 22, 2014  (JP) ................................. 2014-087881

(51) Int. Cl.
*B60H 3/06* (2006.01)
*F16B 5/10* (2006.01)
(Continued)

(52) U.S. Cl.
CPC ....... *B60H 3/0608* (2013.01); *B60H 1/00521* (2013.01); *B60H 3/0658* (2013.01);
(Continued)

(58) Field of Classification Search
CPC .............. B60H 1/00521; B60H 3/0658; B60H 3/0608; F16B 2/14; F16B 5/0635
(Continued)

(56) References Cited

U.S. PATENT DOCUMENTS 5,445,256 A    8/1995 Tabuchi et al.

FOREIGN PATENT DOCUMENTS

| FR | 2727903 A1 | 6/1996 |
|---|---|---|
| JP | H06030535 U | 4/1994 |
| WO | WO-2014162710 A1 | 10/2014 |

*Primary Examiner* — Helena Kosanovic
(74) *Attorney, Agent, or Firm* — Harness, Dickey & Pierce, P.L.C.

(57) ABSTRACT

A structure for attaching a blocking member displaces the blocking member from an insertion position where clamping pawl parts are arranged in a notch part to a fixation position where an opening edge portion is clamped in clearances between the clamping pawl parts and a main body part of the blocking member, thereby to attach the blocking member to an attachment object member. A projecting part that projects toward the blocking member is formed around an opening. At least a part of the projecting part is a side surface projecting part that projects along an outer peripheral side of a side surface of the blocking member when the blocking member is displaced to the fixation position. At least one of the clamping pawl parts is a low-load clamping pawl part. A clearance size between the low-load clamping pawl part and a main body part of the blocking member is provided to be larger than a clearance size between another clamping pawl part and the main body part of the blocking member.

7 Claims, 13 Drawing Sheets

(51) Int. Cl.
 *B60H 1/00* (2006.01)
 *F16B 2/14* (2006.01)
 *F16B 5/06* (2006.01)
(52) U.S. Cl.
 CPC ...... *F16B 5/10* (2013.01); *B60H 2001/00635* (2013.01); *B60H 2003/065* (2013.01); *F16B 2/14* (2013.01); *F16B 5/0635* (2013.01)
(58) Field of Classification Search
 USPC .......................................................... 454/158
 See application file for complete search history.

US 10,300,768 B2

STRUCTURE FOR ATTACHING BLOCKING MEMBER

CROSS REFERENCE TO RELATED APPLICATIONS

This application is a U.S. National Phase Application under 35 U.S.C. 371 of International Application No. PCT/JP2015/001953 filed on Apr. 7, 2015 and published in Japanese as WO 2015/162863 A1 on Oct. 29, 2015. This application is based on and claims the benefit of priority from Japanese Patent Application No. 2014-087881 filed on Apr. 22, 2014. The entire disclosures of all of the above applications are incorporated herein by reference.

TECHNICAL FIELD

The present disclosure relates to a structure for attaching a blocking member for blocking an opening to an attachment object member including the opening, and is effectively applied to the blocking member being attached to a case including therein an air passage.

BACKGROUND ART

Patent Document 1 conventionally discloses a structure for attaching a cover (blocking member) for blocking an opening, which is provided for the case, to a case (attachment object member) including therein an air passage through which air flows.

More specifically, the opening provided for the case in Patent Document 1 is formed to dispose a filter that removes foreign substances mixed in air, inside the air passage from the outside of the case. A notch portion is formed at the opening edge part of this opening, and a clamping pawl part having an L-shape in section for clamping the opening edge part of the opening is formed at the cover.

After the clamping pawl part of the cover is inserted into the notch portion of the case, the attaching structure in Patent Document 1 slides (displaces) the cover, such that the opening edge part of the opening is clamped in the clearance between the clamping pawl part and a main body part of the cover, to thereby attach the cover to the case.

PRIOR ART DOCUMENT

Patent Document

Patent Document 1: FR 2727903 A1

As in Patent Document 1, when blocking the opening, which is provided for the case including therein the air passage, with the cover, the cover is preferably attached appropriately so that air does not leak through the clearance between the case and the cover. Thus, high dimensional accuracy is required for the attaching structure in Patent Document 1 when forming the clamping pawl part at the cover.

In greater details, for example, if the size of the clearance between the clamping pawl part and the main body part of the cover is larger than the thickness size of the opening edge part of the opening, the opening edge part cannot be fixed between the clamping pawl part and the main body part of the cover. Thus, the airtightness when the cover is attached to the case reduces.

In contrast, if the size of the clearance between the clamping pawl part and the main body part of the cover is smaller than the thickness size of the opening edge part of the opening, the above reduction of the airtightness can be limited, but the opening edge part is not easily clamped in between the clamping pawl part and the main body part of the cover. Thus, the attachability at the time of attachment of the cover to the case deteriorates.

SUMMARY OF INVENTION

The present disclosure addresses the above issues. Thus, it is an objective of the present disclosure both to limit a reduction in airtightness when a blocking member is attached to an attachment object member and to improve attachability at the time of attachment of the blocking member to the attachment object member at the same time.

To achieve the objective, a structure for attaching a blocking member in an aspect of the present disclosure includes: an attachment object member; and the blocking member that blocks an opening which is provided at the attachment object member. An opening edge portion of the opening includes a notch part that is formed by cutting out the opening. The blocking member includes a plurality of clamping pawl parts that clamp the opening edge portion. The blocking member is displaced from an insertion position where the plurality of clamping pawl parts are arranged in the notch part to a fixation position where the opening edge portion is clamped in clearances between the plurality of clamping pawl parts and a main body part of the blocking member, so that the blocking member is attached to the attachment object member. The attachment object member includes a projecting part that projects toward the blocking member around the opening. At least a part of the projecting part is a side surface projecting part that projects along an outer peripheral side of a side surface of the blocking member when the blocking member is displaced to the fixation position. At least one of the plurality of clamping pawl parts is a low-load clamping pawl part. A clearance size between the low-load clamping pawl part and the main body part of the blocking member is provided to be larger than a clearance size between another clamping pawl part excluding the low-load clamping pawl part and the main body part of the blocking member.

In this aspect, the clearance size formed by the low-load clamping pawl part of the plurality of clamping pawl parts is provided to be larger than the clearance size formed by another clamping pawl part.

Thus, the force required when displacing the blocking member from the insertion position to the fixation position can be reduced as compared to when the clearance size formed by the low-load clamping pawl part is equal to the clearance size formed by another clamping pawl part.

Even though the low-load clamping pawl part is provided, the reduction of airtightness when the blocking member is attached to the attachment object member can be restrained, since the side surface projecting part is formed around the opening.

The aspect of the present disclosure can achieve both the suppression of the airtightness reduction when the blocking member is attached to the attachment object member, and the improvement in attachability at the time of attachment of the blocking member to the attachment object member at the same time.

In the aspect of the present disclosure, not all the clearance sizes formed by the clamping pawl parts are equal. In other words, not all the clamping pawl parts serve as the low-load clamping pawl parts.

In the above-characterized structure for attaching the blocking member, the clearance size between the low-load clamping pawl part and the main body part of the blocking member may be equal to or larger than a thickness size of the opening edge portion that is clamped in between the low-load clamping pawl part and the main body part of the blocking member.

Consequently, the clearance between the low-load clamping pawl part and the main body part of the blocking member can clamp in the opening edge portion with little force required, thereby to reliably improve the attachability.

In this case, the clearance size between another clamping pawl part and the main body part of the blocking member may be smaller than the thickness size of the opening edge portion that is clamped in between another clamping pawl part and the main body part of the blocking member, to reliably fix the blocking member to the attachment object member.

In the above-characterized structure for attaching the blocking member, the side surface projecting part is formed to draw a line when viewed from the blocking member-side, and the low-load clamping pawl part may be located closer to a central part of the line than the another clamping pawl part.

The airtightness-enhancing effect by the side surface projecting part becomes greater in a direction to approach the central part of the line. Thus, by disposing the low-load clamping pawl part close to the central part of the line, even though the opening edge portion cannot be fixed between the low-load clamping pawl part and the main body part of the blocking member, the reduction of airtightness caused by this can be compensated effectively.

In the above-characterized structure for attaching the blocking member, at least a part of the projecting part may be a bottom surface projecting part that projects toward a bottom surface of the blocking member on the attachment object member-side, and when viewed from the blocking member-side, the bottom surface projecting part may be disposed to overlap with the blocking member in a case where the blocking member is displaced to any of the insertion position and the fixation position.

Such a bottom surface projecting part does not cause an interference when displacing the blocking member from the insertion position to the fixation position, and can thus further improve the attachability at the time of attachment of the blocking member to the attachment object member.

BRIEF DESCRIPTION OF DRAWINGS

The above and other objects, features and advantages of the present disclosure will become more apparent from the following detailed description made with reference to the accompanying drawings. In the drawings.

EMBODIMENT FOR CARRYING OUT INVENTION

An embodiment will be described below with reference to the accompanying drawings. A structure for attaching a blocking member of the present disclosure is applied to the present embodiment when a blower motor controller (hereinafter described simply as a controller) 30 is attached to a case 2 that is configured as the outer shell of a vehicle interior air-conditioning unit 1 in an air-conditioning system for a vehicle. Thus, an attachment object member of the present embodiment is the case 2, and the blocking member of the present embodiment is the controller 30.

The vehicle interior air-conditioning unit 1 takes therein internal air (vehicle compartment interior air) or external air (vehicle compartment exterior air), and adjusts the temperature of the taken-in air to be blown out to the vehicle compartment interior. In greater details, the vehicle interior air-conditioning unit 1 is disposed inward of an instrument board (instrument panel) at the frontmost part of the vehicle compartment interior, and is configured by accommodating in the case 2 various air-conditioning apparatuses that adjust the temperature of air blown out to the vehicle compartment interior, for example.

Thus, the case 2 therein includes an air passage through which air blown out to the vehicle compartment interior flows. The present embodiment employs a case molded from resin (e.g., polypropylene) that has a certain level of resiliency and that is excellent in strength, for the case 2.

Figure 1:
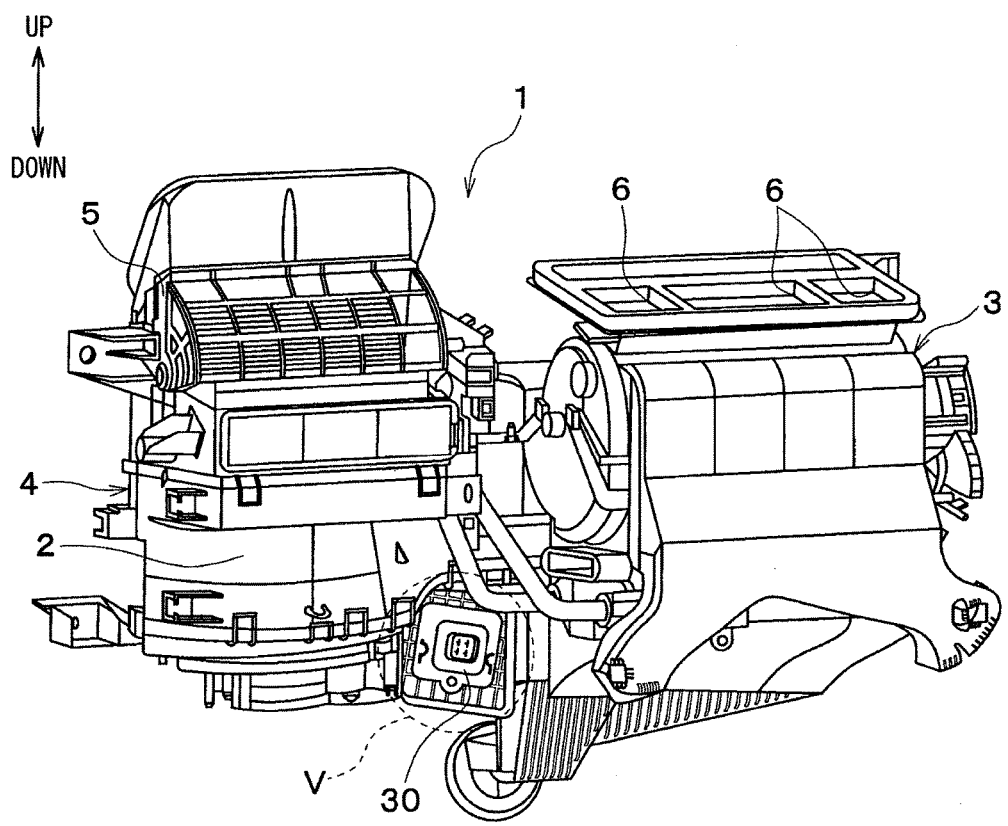
FIG. 1 is an external view illustrating a vehicle interior air-conditioning unit in accordance with an embodiment.

As illustrated in the external perspective view in FIG. 1, the vehicle interior air-conditioning unit 1 is generally divided between an air-conditioning main body unit 3 that is disposed generally at the center of a vehicle in its right and left directions, and a blower unit 4 that is disposed on a passenger seat-side of the air-conditioning main body unit 3. The UP and DOWN arrows in FIG. 1 respectively indicate upper and lower directions in a state where the vehicle interior air-conditioning unit 1 is mounted on the vehicle.

An inside/outside air switching device 5 that switchingly introduces inside air or outside air into the vehicle interior air-conditioning unit 1 is disposed on the most upstream side of the blower unit 4 in the air flow direction. An electric blower (not shown) that draws in the inside air or outside air introduced by the inside/outside air switching device 5 and that blows air toward the vehicle compartment interior is accommodated on a lower side of the inside/outside air switching device 5 as well as inside the blower unit 4.

An opening 20 passing through between the inside and outside of the case 2 is provided at the part of the case 2 on a lower side of the blower unit 4 (part V in FIG. 1). This opening 20 is blocked by the attachment of the controller 30 to the case 2. The controller 30 includes a resistor that adjusts the amount of power supplied to an electric motor of the electric blower accommodated in the blower unit 4. The detailed configurations of the opening 20 and the controller 30 will be described later.

Various air-conditioning apparatuses such as a cooling heat exchanger that cools blown air which is blown from the blower unit 4, a heating heat exchanger that heats blown air, and an air mixing door (all of which are not shown) are accommodated inside the air-conditioning main body unit 3.

The cooling heat exchanger is an evaporator for a vapor-compression type refrigeration cycle device that exchanges heat between blown air and low-pressure refrigerant to evaporate the low-pressure refrigerant. The heating heat exchanger is a heater core that exchanges heat between the coolant of an engine for vehicle traveling and blown air to heat the blown air. The air mixing door is a temperature regulating means for regulating the temperature of blown air blown out to the vehicle compartment interior by adjustment of the air volume of blown air passing through the heating heat exchanger.

Outflow ports 6 through which the blown air whose temperature has been regulated flows out toward the vehicle compartment interior are provided on the most downstream side of the air-conditioning main body unit 3 in the air flow direction. The blown air which has flowed out of these outflow ports is guided into a blow-out port provided in the vehicle compartment interior through a duct (not shown) to be blown out to the vehicle compartment interior through the blow-out port.

Figure 2:
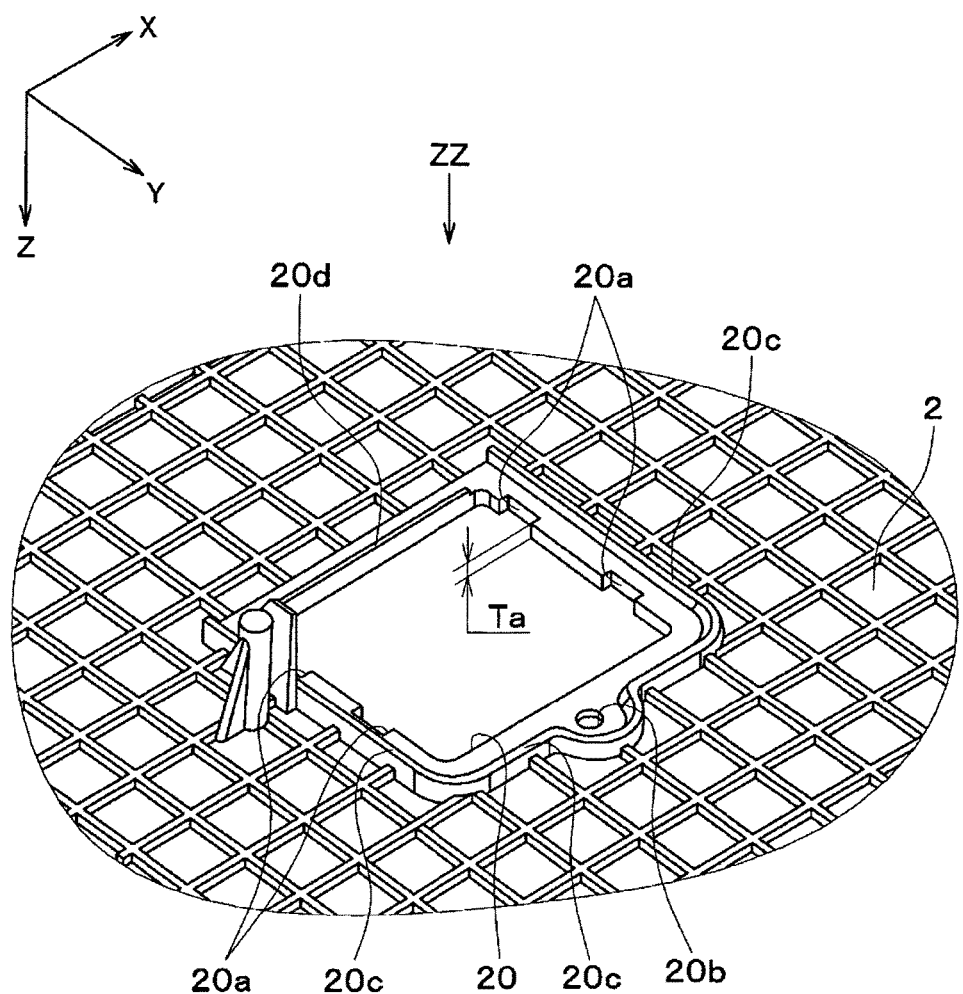
FIG. 2 is an external perspective view illustrating an opening of the embodiment.

The detailed configuration of the opening 20 provided at the case 2 will be described with reference to FIGS. 2 and 3. FIG. 2 illustrates the external appearance of the opening 20 viewed from a direction different from FIG. 1 for the clarification of illustration. In the drawings of FIG. 2 and thereafter, the direction perpendicular to the flat surface on which the opening 20 is formed is referred to as a Z-axis direction, a predetermined direction parallel to the flat surface on which the opening 20 is formed is referred to as an X-axis direction, and the direction perpendicular to the Z-axis and the X-axis is referred to as a Y-axis direction.

Figure 3:
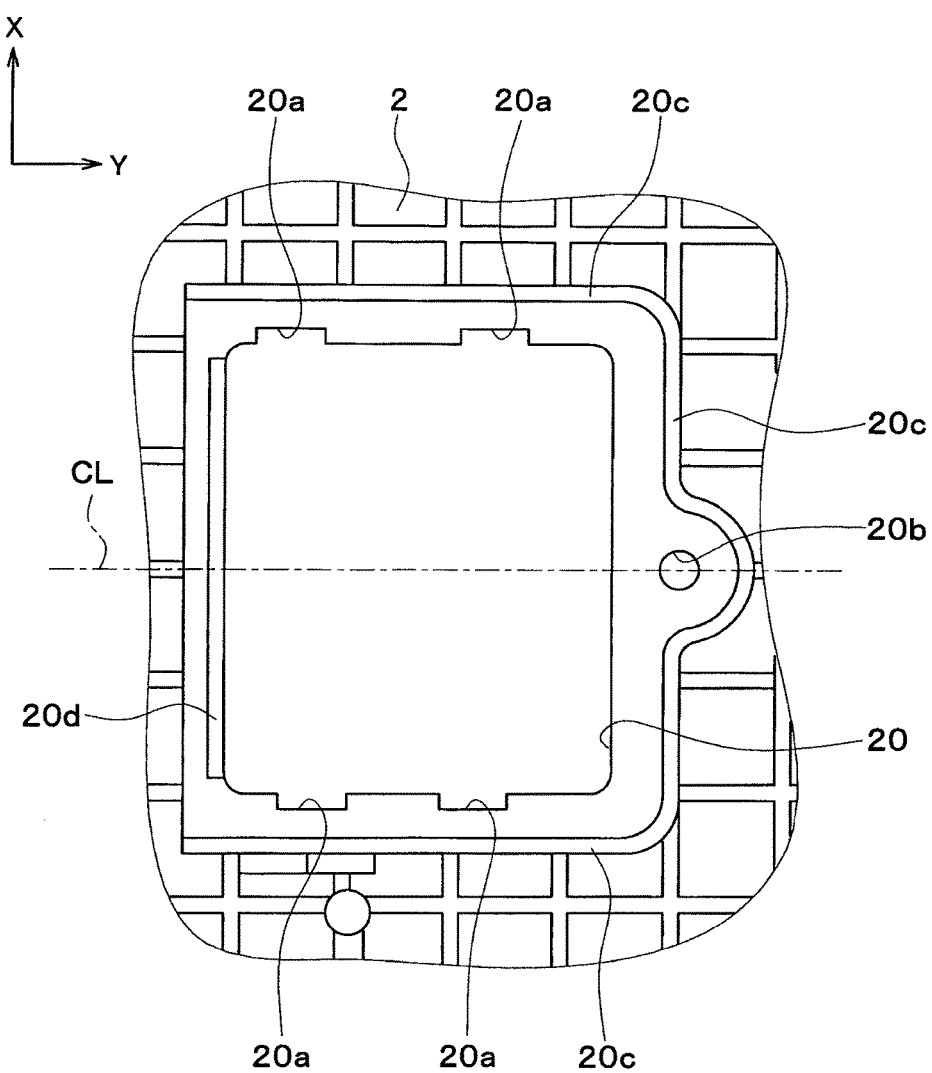
FIG. 3 is a top view illustrating the opening viewed from a direction ZZ in FIG. 2.

As illustrated in FIGS. 2 and 3, the opening 20 of the present embodiment is formed in a polygonal shape (quadrangular shape (rectangular shape) in the present embodiment) when viewed from the Z-axis direction. The opening 20 includes more than one (four in the present embodiment) notch parts 20a that are formed by cutting out the opening edge portion of the opening 20. A recessed part 20b that is formed by depressing the surface of the case 2 is provided near the opening 20.

In greater details, the recessed part 20b is formed near one side of the four sides constituting the opening 20 that extends in the X-axis direction to serve as a mark indicating a positional relationship between the opening 20 and the controller 30 at the time of attachment of the controller 30 to the case 2.

Two notch parts 20a are formed at each of the two sides extending in the Y-axis direction (i.e., two sides opposed to each other with the side close to the recessed part 20b located therebetween), and are configured as the spaces in which clamping pawl parts 31b, 31c (described later) of the controller 30 are inserted at the time of attachment of the controller 30 to the case 2.

As illustrated in FIG. 3, the two notch parts 20a, which are provided at each of the two sides extending in the Y-axis direction, are arranged asymmetrically with respect to an imaginary central line CL that is positioned at the center of the two sides extending in the Y-axis direction when viewed from the Z-axis direction.

Projecting parts 20c, 20d that project toward a main body part 31 of the controller 30 (described later) are formed around the opening 20.

The projecting parts of these projecting parts 20c, 20d that are formed along the three sides in total: the side of the opening 20 close to the recessed part 20b; and the two sides for which the notch parts 20a are provided, are side surface projecting parts 20c that project along the outer peripheral side of the side surface of the main body part 31 of the controller 30 when the controller 30 is attached to the case 2. Thus, the side surface projecting parts 20c are formed to draw a generally U-shaped line when viewed from the Z-axis direction.

On the other hand, the projecting part that is formed along the side which is opposed to the side close to the recessed part 20b is a bottom surface projecting part 20d that projects toward the bottom surface of the main body part 31 of the controller 30 on the case 2-side when the controller 30 is attached to the case 2. Thus, the amount of projection of the bottom surface projecting part 20d toward the controller 30 is smaller than the amount of projection of the side surface projecting part 20c toward the controller 30 in the present embodiment.

Figure 4:
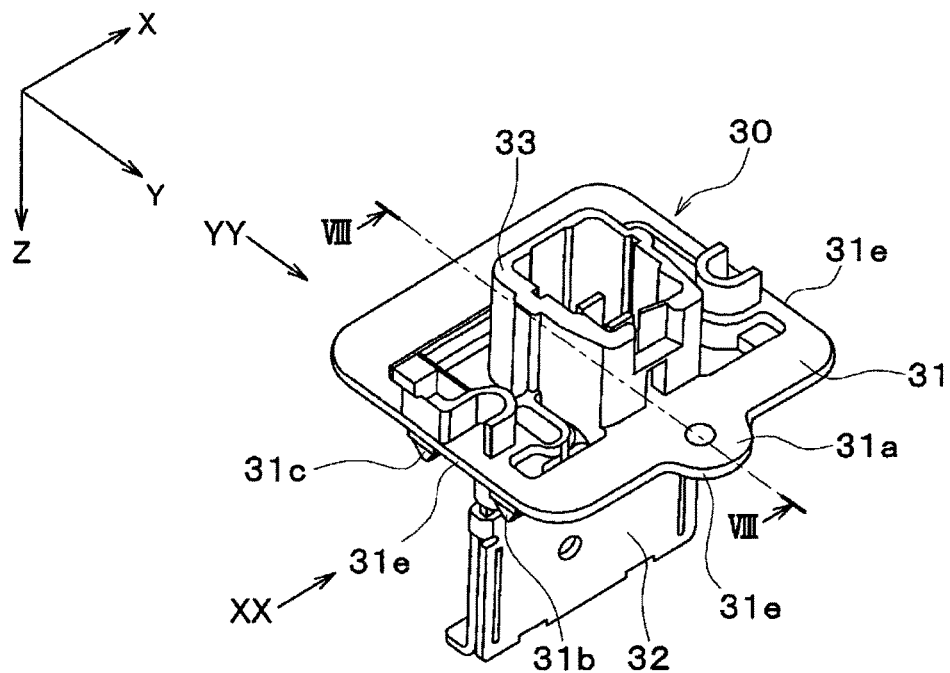
FIG. 4 is an external perspective view illustrating a controller according to the embodiment.

The detailed configuration of the controller 30 will be described with reference to FIGS. 4 to 8. FIG. 4 illustrates the external appearance of the controller 30 viewed from the same direction as in FIG. 2. The controller 30 includes the main body part 31 that covers and blocks the opening 20 when attached to the case 2, a resistor 32 that adjusts the electric power supplied to the electric motor of the electric blower, and a connector 33 to which an electric wire is connected.

The main body part 31 is a member having the shape of a flat plate extending parallel to the surface of the case 2 on which the opening 20 is formed, and is formed into a polygonal shape (quadrangular shape in the present embodiment) similar to the opening 20 when viewed from the Z-axis direction. The main body part 31 and the body part of the connector 33 are integrally formed from resin having the same material as the case 2. The connector 33 is formed on the surface of the main body part 31 on its opposite side from the case 2, and the resistor 32 is attached on the surface of the main body part 31 on the case 2-side.

The main body part 31 includes a semicircular part 31a, the clamping pawl parts 31b, 31c, guide parts 31d, an outer edge part 31e, and a bottom surface side recessed part 31f.

The semicircular part 31a serves as a mark indicating a positional relationship between the opening 20 and the controller 30 at the time of attachment of the controller 30 to the case 2, and is formed at one side of the four sides constituting the quadrangular main body part 31 that extends in the X-axis direction as illustrated in FIG. 4. The semicircular part 31a is formed in a shape that projects in the Y-axis direction to overlap with the recessed part 20b of the case 2 when the controller 30 is attached to the case 2.

The clamping pawl parts 31b, 31c are for clamping the opening edge portion of the opening 20, and are arranged on the inner surface of the main body part 31 (surface on the resistor 32-side). More specifically, the clamping pawl parts 31b, 31c are formed in an L-shape in section, and open toward the outer periphery of the main body part 31 to form a space for clamping in the opening edge portion between the main body part 31 and the clamping pawl parts 31b, 31c.

Figure 7:
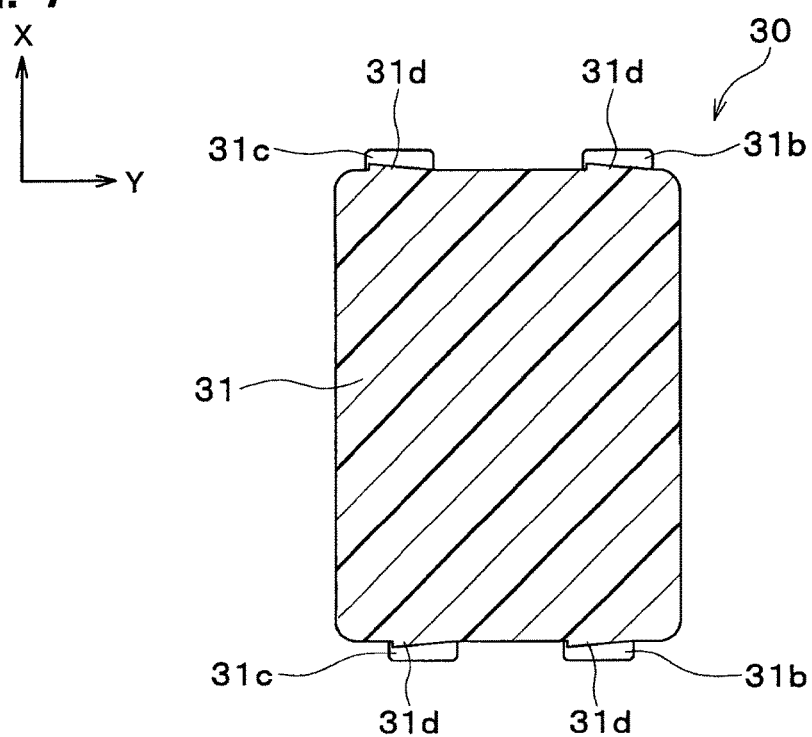
FIG. 7 is a cross-sectional view taken along a line VII-VII in FIG. 5.

The same number (four in the present embodiment) of the clamping pawl parts 31b, 31c as the notch parts 20a of the opening 20 are formed. When viewed from the Z-axis direction, the clamping pawl parts 31b, 31c are formed at positions corresponding to the respective notch parts 20a as illustrated in FIG. 7. Thus, the clamping pawl parts 31b, 31c are arranged to be capable of being inserted into their corresponding notch parts 20a at the same time at the time of attachment of the controller 30 to the case 2.

Figure 5:
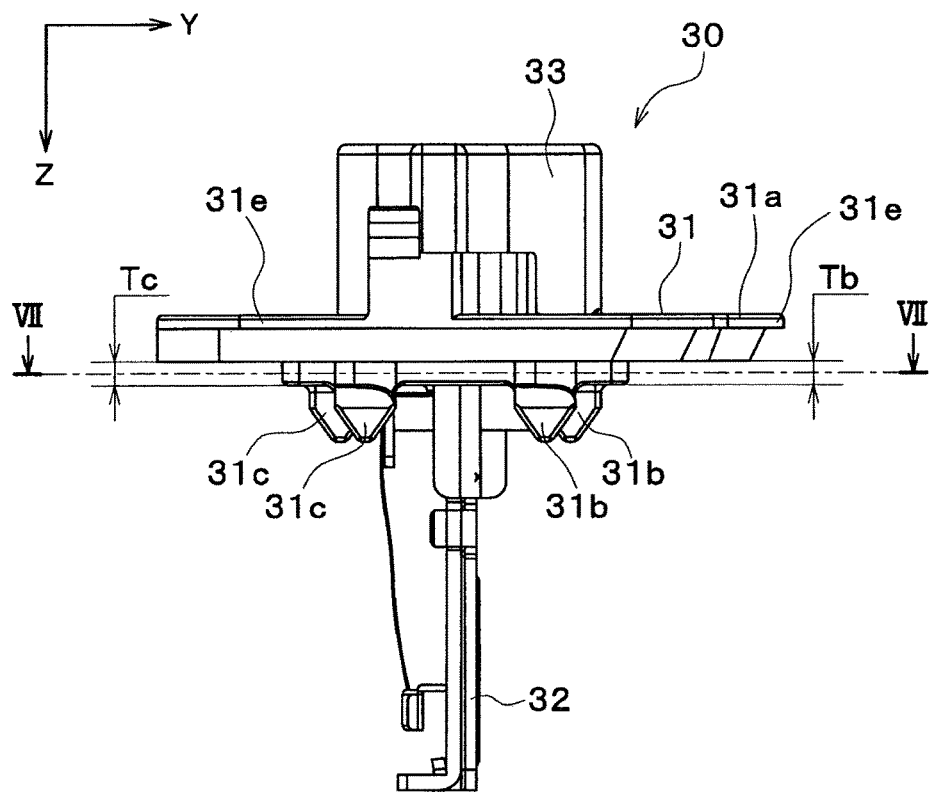
FIG. 5 is a side view illustrating the controller viewed from a direction XX in FIG. 4.

As illustrated in FIG. 5, the clamping pawl parts 31b, 31c of the present embodiment are formed to have such shapes that the size of the clearance between each of the clamping pawl parts 31b, 31c and the main body part 31 reduces gradually in a direction to separate from the semicircular part 31a-side.

For each side, when the smallest clearance size between the clamping pawl part 31b closer to the semicircular part 31a and the main body part 31 is referred to as Tb, the smallest clearance size between the clamping pawl part 31c farther from the semicircular part 31a and the main body part 31 is referred to as Tc, and the thickness size of the opening edge portion of the case 2 is referred to as Ta (see FIG. 2), Ta, Tb, Tc are set to satisfy the following mathematical expression F1.

$$Tb \geq Ta > Tc \tag{F1}$$

Thus, the smallest clearance size Tb between the clamping pawl part 31b closer to the semicircular part 31a and the main body part 31 is provided to be larger than the smallest clearance size Tc between the clamping pawl part 31c farther from the semicircular part 31a and the main body part 31.

The clearance size Tb is equal to or larger than the thickness size Ta of the opening edge portion that is clamped in between the clamping pawl part 31b closer to the semicircular part 31a and the main body part 31. The clearance size Tc is smaller than the thickness size Ta of the opening edge portion that is clamped in between the clamping pawl part 31c farther from the semicircular part 31a and the main body part 31.

This means that the force required when the opening edge portion is clamped in between the clamping pawl part 31b closer to the semicircular part 31a and the main body part 31 is smaller than the force required when the opening edge portion is clamped in between the clamping pawl part 31c farther from the semicircular part 31a and the main body part 31.

Thus, for each side, the clamping pawl part 31b closer to the semicircular part 31a serves as a "low-load clamping pawl part." In contrast, for each side, the clamping pawl part 31c farther from the semicircular part 31a serves as "another clamping pawl part."

When viewed from the Z-axis direction, the low-load clamping pawl part 31b of the present embodiment is located closer to the central part of the generally U-shaped line drawn by the side surface projecting part 20c (to the recessed part 20b of the case 2) than another clamping pawl part 31c. In other words, the low-load clamping pawl part 31b is located nearer to the central part than the end part of the generally U-shaped line drawn by the side surface projecting part 20c when viewed from the Z-axis direction.

The guide part 31d performs the function of guiding the main body part 31 to an appropriate position of the case 2 at the time of attachment of the controller 30 to the case 2, and is formed at the region of each of the clamping pawl parts 31b, 31c that extends in the Z-axis direction, as illustrated in the cross-sectional view in FIG. 7. More specifically, the guide part 31d is formed in a shape that projects toward the side surface of the opening edge portion, and is formed in a shape whose projecting amount reduces gradually in the Y-axis direction.

Figure 6:
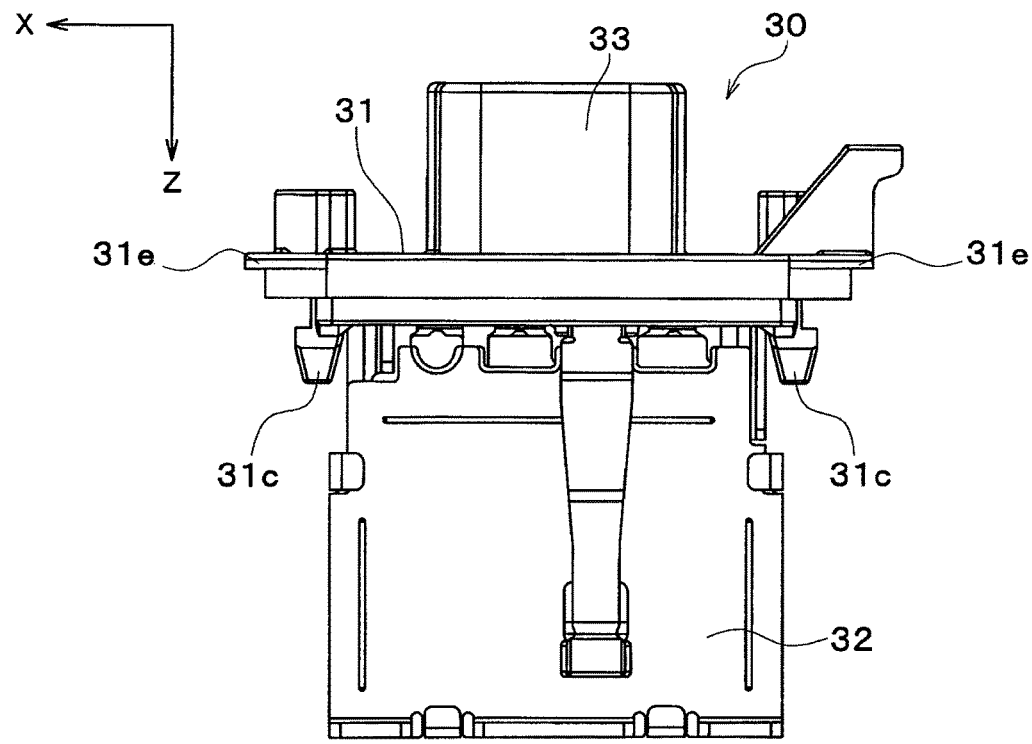
FIG. 6 is a front view illustrating the controller viewed from a direction YY in FIG. 4.

As illustrated in, for example, FIGS. 4, 5, and 6, the outer edge part 31e is formed on the outer peripheral sides of the three sides of the quadrangular shape formed by the main body part 31, and is disposed to cover the above-described end part of the side surface projecting part 20c when the controller 30 is attached to the case 2.

Figure 8:
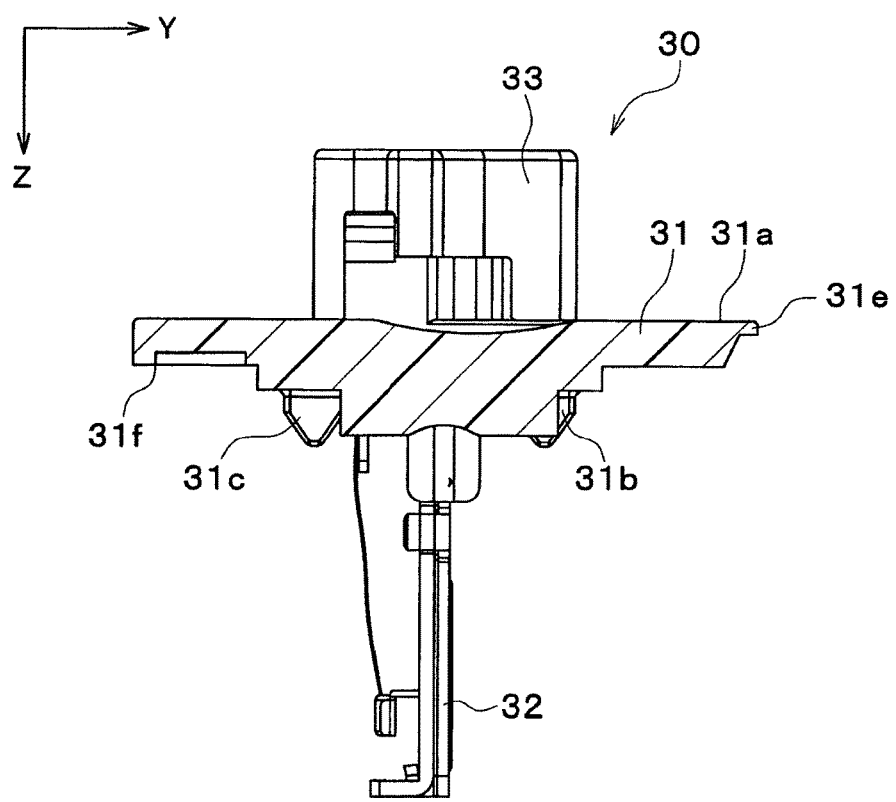
FIG. 8 is a cross-sectional view taken along a line VIII-VIII in FIG. 4.

As illustrated in the cross-sectional view in FIG. 8, the bottom surface side recessed part 31f is formed by depressing the inner surface of the main body part 31 (surface on the resistor 32-side), and serves as a space for accommodating the bottom surface projecting part 20d. FIG. 8 illustrates only the vicinity of the main body part 31 in cross-section for the clarification of illustration. This is also the same in FIGS. 12 and 14, which are described later.

Figure 9:
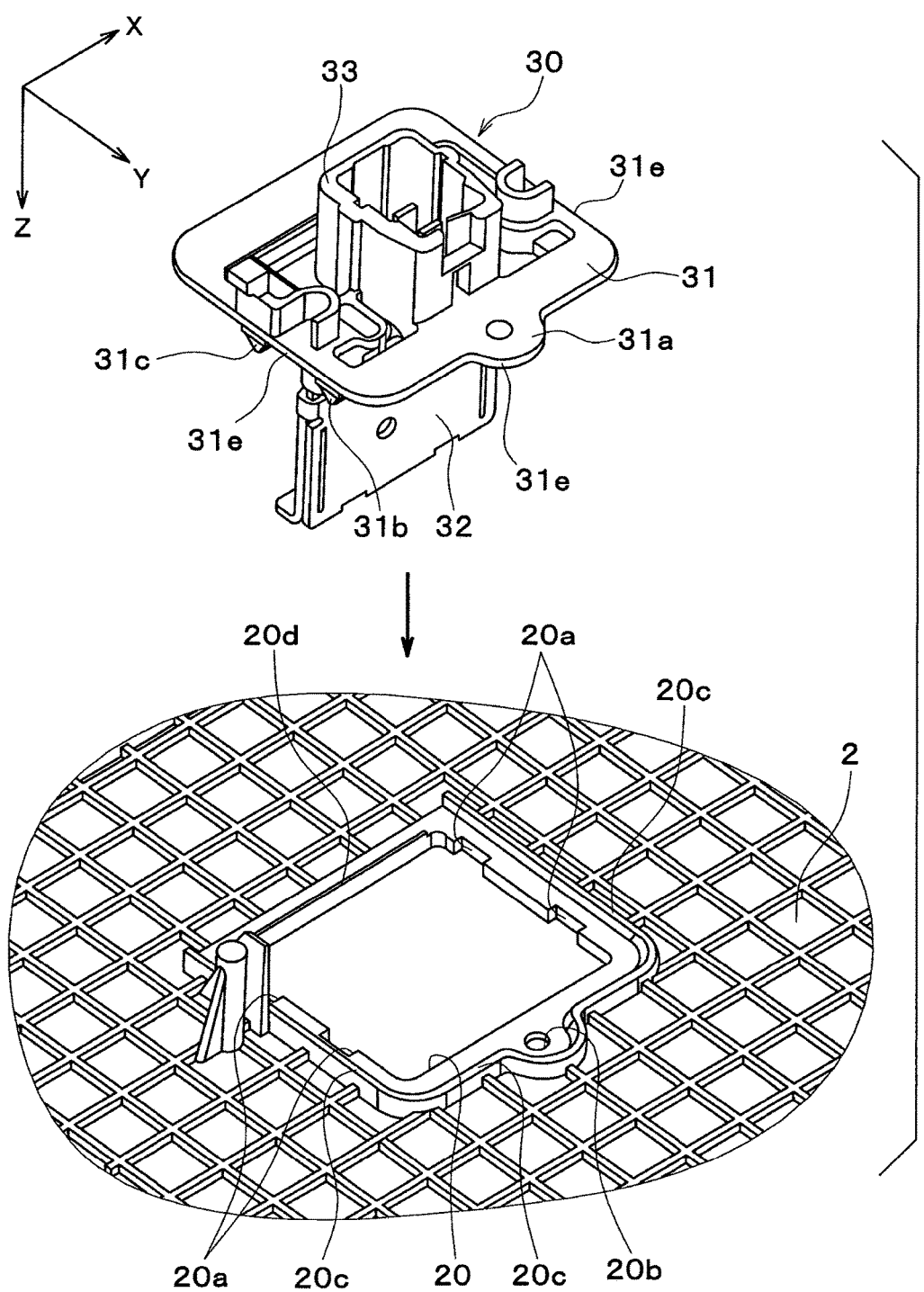
FIG. 9 is a diagram illustrating an initial state at the time of attachment of the controller to a case according to the embodiment.
Figure 10:
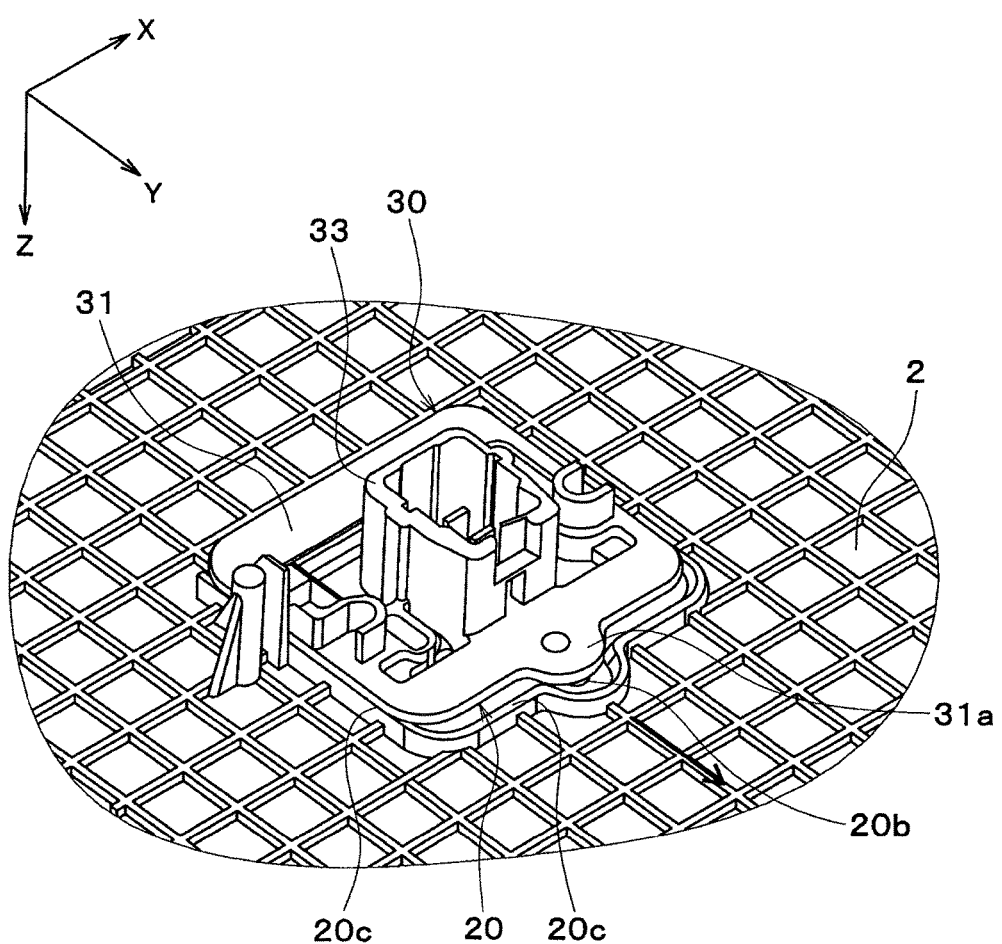
FIG. 10 is a diagram illustrating a state where the controller is displaced to an insertion position at the time of attachment of the controller to the case according to the embodiment.

The attachment process at the time of attachment of the controller 30 to the case 2 will be described with reference to FIGS. 9 to 11. First, the controller 30 is displaced in the Z-axis direction from the outside of the case 2 as indicated by a bold continuous arrowed line in FIG. 9, and the resistor 32-side of the controller 30 is inserted into the opening 20 as illustrated in FIG. 10 (insertion process).

In this case, the controller 30 of the present embodiment is disposed, such that the side of the main body part 31 closer to the semicircular part 31a and the side of the opening 20 closer to the recessed part 20b are on the same side. Consequently, the clamping pawl parts 31b, 31c of the main body part 31 can be arranged in their corresponding notch parts 20a of the opening 20.

Thus, in the insertion process, the controller 30 is displaced to an "insertion position."

If the side of the main body part 31 closer to the semicircular part 31a and the side of the opening 20 closer to the recessed part 20b are not arranged on the same side in the insertion process, the clamping pawl parts 31b, 31c cannot be arranged in their corresponding notch parts 20a. The reason for this is that the respective notch parts 20a are arranged asymmetrically with respect to the imaginary central line CL, as described with reference to FIG. 3.

Figure 11:
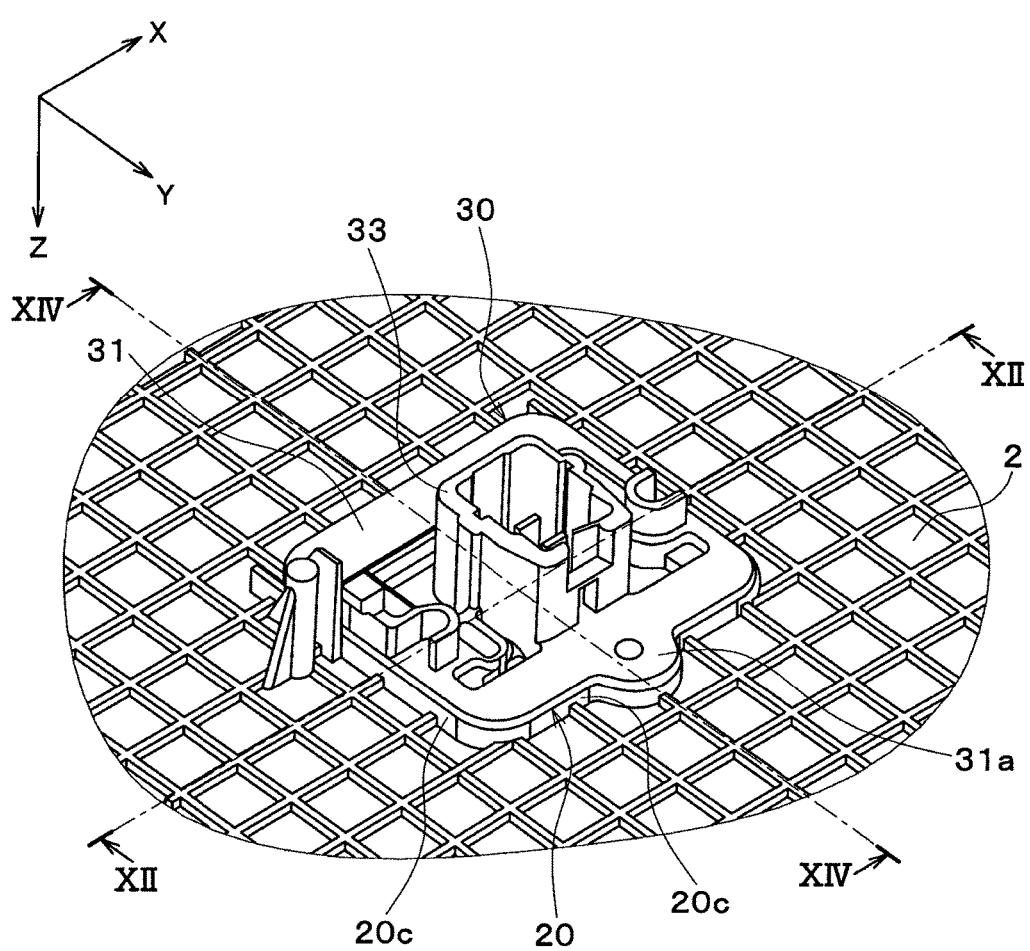
FIG. 11 is a diagram illustrating a state where the controller is displaced to a fixation position at the time of attachment of the controller to the case according to the embodiment.

Subsequently, the controller 30 that is located at the insertion position is displaced in the Y-axis direction as indicated by a bold continuous arrowed line in FIG. 10, and the semicircular part 31a of the main body part 31 is overlapped with the recessed part 20b of the case 2 as illustrated in FIG. 11 (fixation process). The opening edge portion of the opening 20 is accordingly clamped in the clearances between the clamping pawl parts 31b, 31c and the main body part 31 and the controller 30 is thereby fixed to the case 2.

Thus, in the fixation process, the controller 30 is displaced to a "fixation position."

As described above, the structure for attaching the blocking member (controller 30) of the present embodiment attaches the controller 30 to the case 2 by displacing the controller 30 from the insertion position to the fixation position.

When the opening 20 provided for the case 2 of the vehicle interior air-conditioning unit 1 is blocked with the controller 30 as in the present embodiment, the controller 30 may be attached to the case 2 appropriately so that air does not leak through the clearance between the case 2 and the controller 30 for the realization of efficient air-conditioning and the reduction of a noise due to air leakage.

For example, if the clearance sizes Tb, Tc between the clamping pawl parts 31b, 31c and the main body part 31 are larger than the thickness size Ta of the opening edge portion of the opening 20, the opening edge portion cannot be fixed between the clamping pawl parts 31b, 31c and the main body part 31. Thus, the airtightness when the case 2 and the controller 30 are attached together easily reduces.

In contrast, if the clearance sizes Tb, Tc between the clamping pawl parts 31b, 31c and the main body part 31 are smaller than the thickness size Ta of the opening edge portion of the opening 20, the above-described reduction of airtightness can be restricted but the opening edge portion is not easily clamped in between the clamping pawl parts 31b, 31c and the main body part 31. Thus, the attachability at the time of attachment of the controller 30 to the case 2 may deteriorate.

On the other hand, according to the attaching structure of the present embodiment, the clearance size Tb formed by the low-load clamping pawl part 31b is larger than the clearance size Tc formed by another clamping pawl part 31c. Thus, the force required when displacing the controller 30 from the insertion position to the fixation position can be reduced as compared to when the clearance size Tb formed by the low-load clamping pawl part 31b is equal to the clearance size Tc formed by another clamping pawl part 31c.

Even though the low-load clamping pawl part 31b is provided, the reduction of airtightness when the controller 30 is attached to the case 2 can be restrained, since the side surface projecting part 20c is formed around the opening 20.

Figure 12:
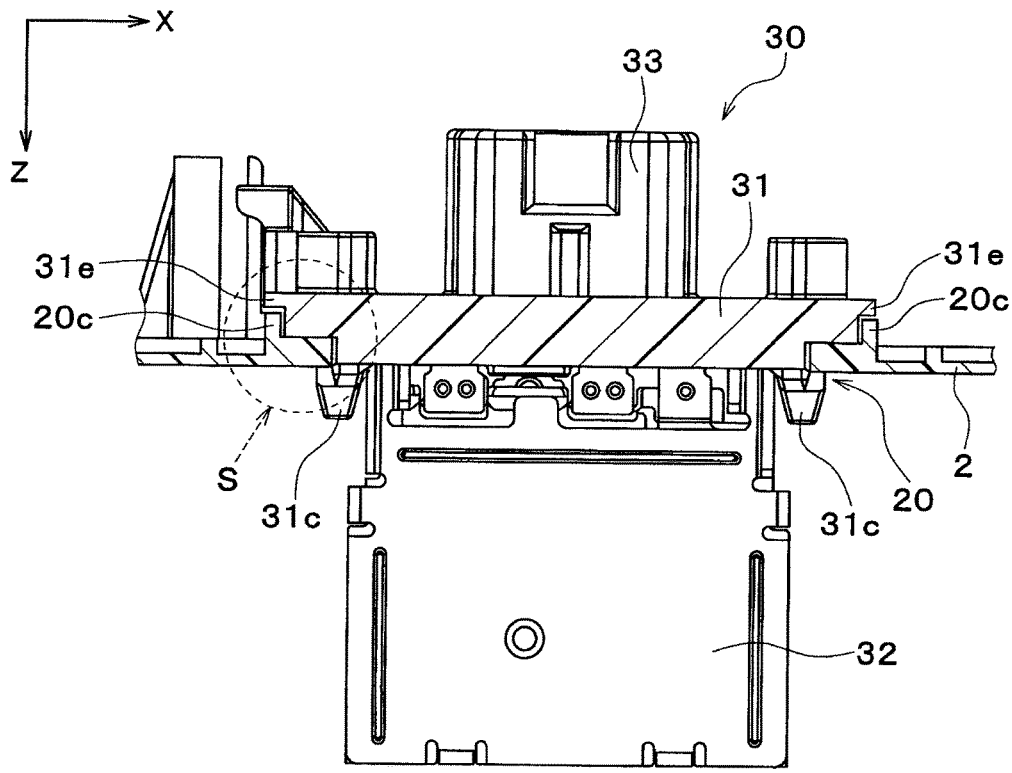
FIG. 12 is a sectional view taken along a line XII-XII in FIG. 11.
Figure 13:
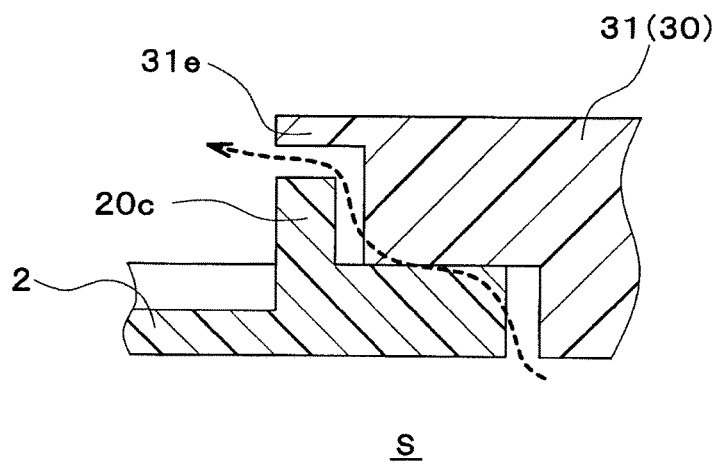
FIG. 13 is an enlarged view illustrating a part S in FIG. 12.

In greater details, in the present embodiment, the side surface projecting part 20c of the case 2 is located adjacent to the side surface of the main body part 31, and the outer edge part 31e of the main body part 31 is disposed to cover the end part of the side surface projecting part 20c as illustrated in FIGS. 12 and 13. Consequently, a labyrinth seal structure can be formed between the opening 20 and the controller 30.

Such a labyrinth seal structure can increase the ventilating resistance to the air leaking flow indicated by a short dashes arrowed line in FIG. 13. Thus, the reduction of airtightness when the controller 30 is attached to the case 2 can be restrained compared to a surface seal structure whereby the surface of the main body part 31 on the case 2-side and the outer surface of the case 2 are simply in contact as in the conventional art.

Thus, the structure for attaching the blocking member of the present embodiment can achieve both the suppression of the airtightness reduction when the controller 30 serving as a blocking member is attached to the case 2 which is an attachment object member, and the improvement in attachability at the time of attachment of the controller 30 to the case 2 at the same time.

In other words, the structure for attaching the blocking member of the present embodiment can improve the attachability at the time of attachment of the controller 30 to the case 2 without reducing the airtightness when the controller 30 is attached to the case 2.

Figure 14:
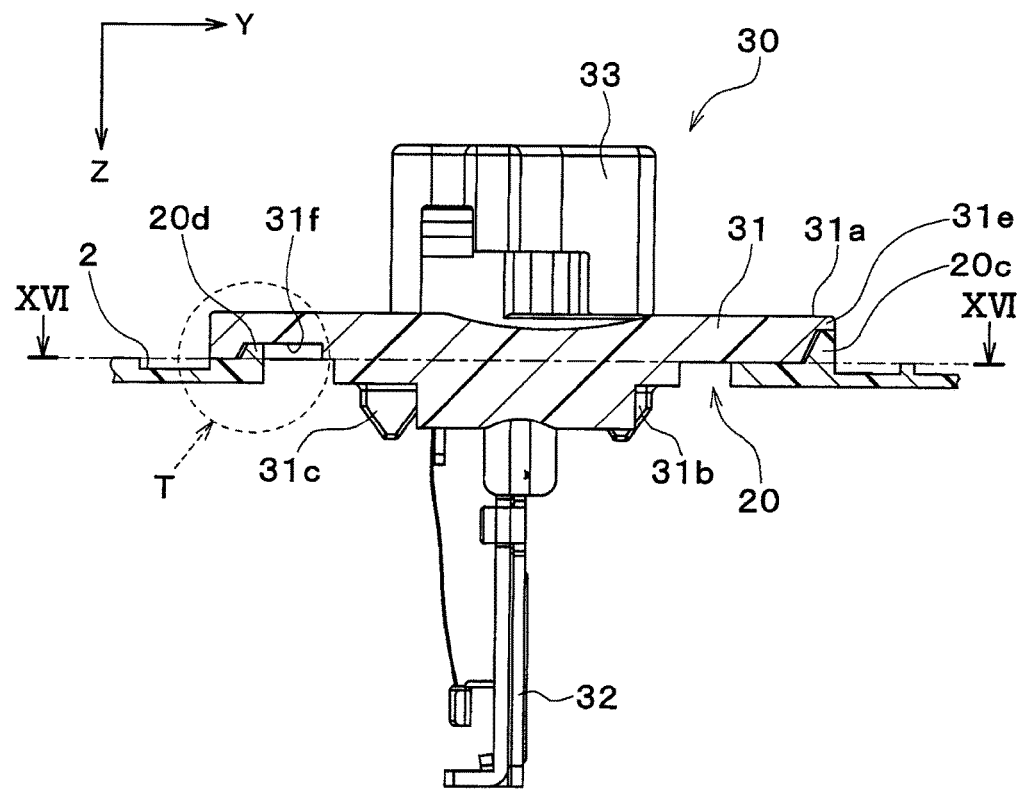
FIG. 14 is a sectional view taken along a line XIV-XIV in FIG. 11.
Figure 15:
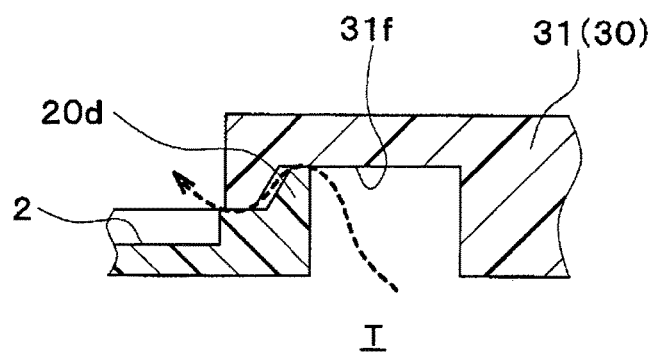
FIG. 15 is an enlarged view illustrating a part T in FIG. 14.

In the present embodiment, the bottom surface projecting part 20d is formed in the range around the opening 20 where the side surface projecting part 20c is not formed. Thus, as illustrated in FIGS. 14 and 15, a labyrinth seal structure is formed by the bottom surface projecting part 20d and the bottom surface side recessed part 31f, and the ventilating resistance to the air leaking flow indicated by a short dashes arrowed line in FIG. 15 can be increased. As a result, the reduction of airtightness can further be limited.

The investigation by the inventor reveals that the amount of air leaking from the clearance between the case 2 and the controller 30 can be reduced to approximately 20% of that of the conventional art through the formation of a labyrinth seal structure by providing the side surface projecting part 20c and the bottom surface projecting part 20d around the opening 20 as in the present embodiment.

When the controller 30 is displaced to any of the insertion position and the fixation position, the bottom surface projecting part 20d of the present embodiment is covered by the main body part 31 (i.e., disposed to overlap with the main body part 31 when viewed from the Z-axis direction) and thereby does not cause an interference when displacing the controller 30 from the insertion position to the fixation position.

Thus, because at least a part of the projecting part formed around the opening 20 serves as the bottom surface projecting part 20d, the improvement in attachability can further be achieved.

The present embodiment sets the thickness size Ta of the opening edge portion, the clearance size Tb formed by the low-load clamping pawl part 31b, and the clearance size Tc formed by another clamping pawl part 31c to satisfy the above mathematical expression F1.

Based on this, the thickness size Ta of the opening edge portion and the clearance size Tb formed by the low-load clamping pawl part 31b have a loose-fitting size relationship. Consequently, the clearance formed by the low-load clamping pawl part 31b can clamp in the opening edge portion with little force required to reliably improve the attachability.

In contrast, the thickness size Ta of the opening edge portion and the clearance size Tc formed by another clamping pawl part 31c have a tight-fitting size relationship. Consequently, the opening edge portion can reliably be fixed in the clearance formed by the low-load clamping pawl part 31b.

When viewed from the Z-axis direction, the low-load clamping pawl part 31b of the present embodiment is located closer to the central part of the generally U-shaped line drawn by the side surface projecting part 20c (to the recessed part 20b of the case 2) than another clamping pawl part 31c.

The side surface projecting part 20c of the present embodiment is formed along the three sides in total: the side of the opening 20 close to the recessed part 20b; and the two sides for which the notch parts 20a are provided. Thus, the airtightness-enhancing effect by the side surface projecting part 20c becomes the greatest near the central part (recessed part 20b) of the generally U-shaped line. Consequently, even though the opening edge portion cannot be fixed between the low-load clamping pawl part 31b and the main body part 31, the reduction of airtightness caused by this can be compensated effectively.

In the present embodiment, the guide parts 31d are formed at the main body part 31, and thus the controller 30 can be displaced appropriately to the fixation position in the insertion process.

Figure 16:
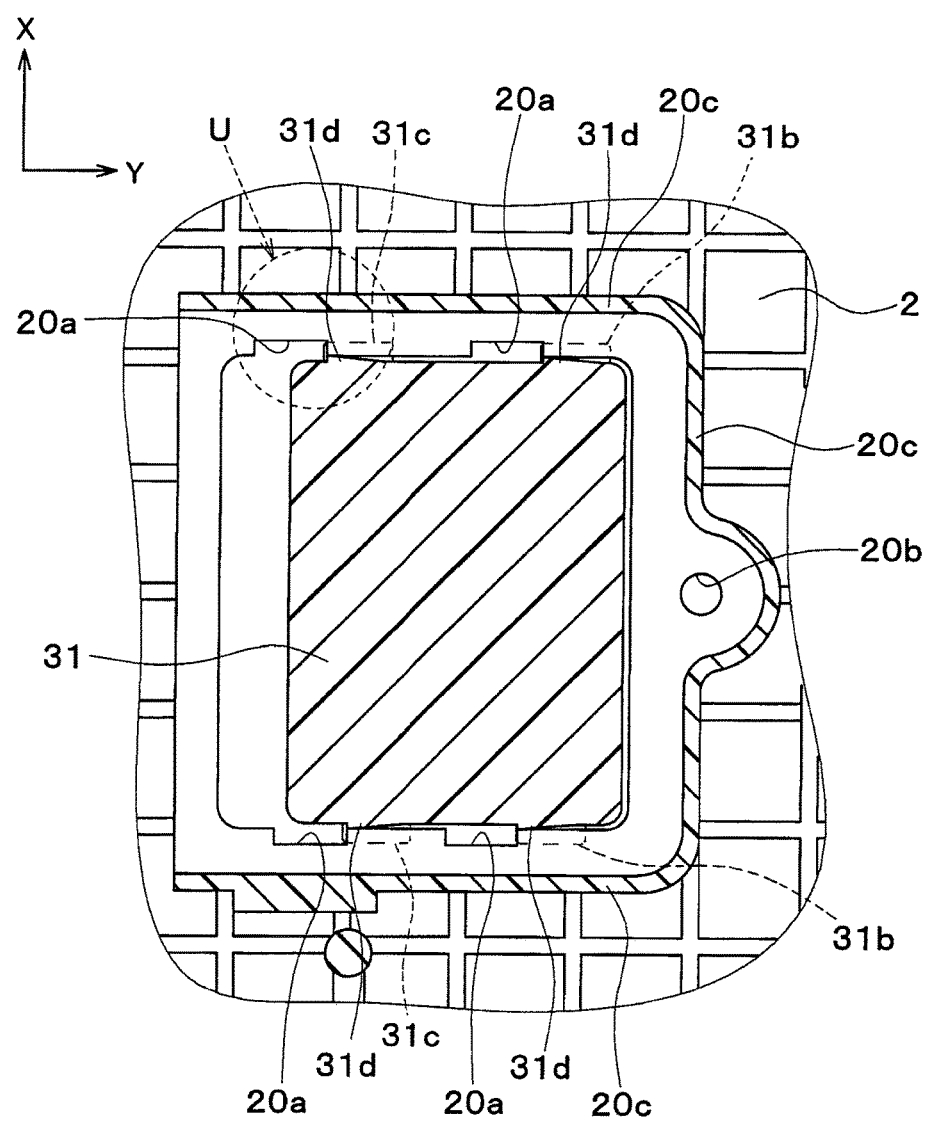
FIG. 16 is a cross-sectional view taken along a line XVI-XVI in FIG. 14.
Figure 17:
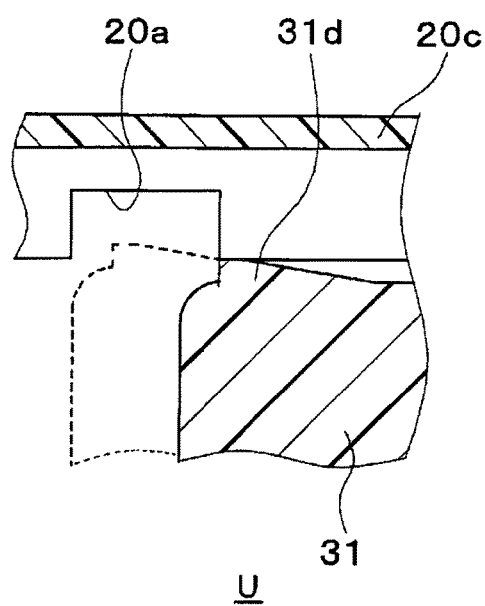
FIG. 17 is an enlarged view illustrating a U part in FIG. 16.

In greater details, the guide part 31d is formed in a shape whose projecting amount reduces gradually in the direction in which the controller 30 is displaced from the insertion position to the fixation position. Consequently, in the insertion process as illustrated in FIGS. 16 and 17, for example, even though the main body part 31 is disposed lopsidedly on one side in the X-axis direction as indicated by the short dashes lines, the controller 30 can be guided to an appropriate fixation position by the guide parts 31$d$ through the displacement of the controller 30 in the Y-axis direction.

The present embodiment forms the opening 20 in a polygonal shape, and forms the side surface projecting part 20$c$ and the bottom surface projecting part 20$d$ along at least two sides of the polygonal shape. More specifically, the opening 20 is formed in a quadrangular shape, the side surface projecting part 20$c$ is formed along three sides of the quadrangular shape, and the bottom surface projecting part 20$d$ is formed along the remaining one side.

This can make the side surface projecting part 20$c$ and the bottom surface projecting part 20$d$ function as the ribs for enhancing the rigidity of the surface of the case 2 on which the opening 20 is formed, to improve the flatness of the surface of the case 2 on which the opening 20 is formed. Consequently, the reduction of airtightness when the controller 30 is attached to the case 2 can be further limited.

The present disclosure is not limited to the above-described embodiment, and can be modified variously as follows without departing from the scope of the disclosure.

(1) The above embodiment illustrates that the structure for attaching the blocking member of the present disclosure is applied to the case where the controller 30 is attached to the case 2 of the vehicle interior air-conditioning unit 1. However, the application of the present disclosure is not limited to this example.

For example, the opening provided on the case 2 may be an opening that is used at the time of maintenance of the air-conditioning apparatus accommodated in the case 2. The blocking member may be a simple cover, or a component of an air cleaning unit (plasma cluster generator, nano-ion generator), for example.

The structure for attaching the blocking member of the present disclosure can be applied to the case where the blocking member for blocking a wide opening is attached to an attachment object member having this opening, as well as to the air-conditioning system.

(2) The above embodiment illustrates that two of the four clamping pawl parts 31$b$, 31$c$ serve as the low-load clamping pawl parts 31$b$. However, the number of the clamping pawl parts 31$b$, 31$c$ is not limited to four, and at least one of these pawl parts may be configured as a low-load clamping pawl part 31$b$.

The above embodiment illustrates that the low-load clamping pawl part 31$b$ is located closer to the central part of the generally U-shaped line drawn by the side surface projecting part 20$c$ than another clamping pawl part 31$c$. Alternatively, the low-load clamping pawl part 31$b$ may be located closer to the end part of the generally U-shaped line drawn by the side surface projecting part 20$c$ than another clamping pawl part 31$c$.

(3) The above embodiment illustrates that the opening 20 is formed in a polygonal shape, but the shape of the opening 20 is not limited to this example. For example, the opening 20 may be formed in a circular shape or an elliptical shape when viewed from the Z-axis direction.

In this case, when viewed from the Z-axis direction, the side surface projecting part 20$c$ may be formed to draw a semicircular arc-shaped line around the opening 20, and the bottom surface projecting part 20$d$ may be formed to draw a semicircular arc-shaped line in the remaining region around the opening 20. The clamping pawl part 31$b$ may be located closer to the central part of the semicircular arc-shaped line than another clamping pawl part 31$c$.

(4) The above embodiment illustrates that the recessed part 20$b$ and the semicircular part 31$a$ are provided as marks indicating the displacement direction of the controller 30 at the time of attachment of the controller 30 to the case 2. The recessed part 20$b$ and the semicircular part 31$a$ are disposed to overlap at the fixation position. Thus, the controller 30 may be fixed to the case 2 by screw-fastening the semicircular part 31$a$ to the recessed part 20$b$.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

What is claimed is:

1. A structure for attaching a blocking member, comprising:
    an attachment object member; and
    the blocking member that blocks an opening which is provided at the attachment object member, wherein:
        an opening edge portion of the opening includes a notch part that is formed by cutting out the opening;
        the blocking member includes a plurality of clamping pawl parts that clamp the opening edge portion;
        the blocking member is displaced from an insertion position where the plurality of clamping pawl parts are arranged in the notch part to a fixation position where the opening edge portion is clamped in clearances between the plurality of clamping pawl parts and a main body part of the blocking member, so that the blocking member is attached to the attachment object member;
        the attachment object member includes a projecting part that projects toward the blocking member around the opening;
        at least a part of the projecting part is a side surface projecting part that projects along an outer peripheral side of a side surface of the blocking member when the blocking member is displaced to the fixation position;
        at least one of the plurality of clamping pawl parts is a low-load clamping pawl part; and
        a clearance size between the low-load clamping pawl part and the main body part of the blocking member is provided to be larger than a clearance size between another clamping pawl part of the plurality of clamping pawl parts and the main body part of the blocking member.

2. The structure for attaching the blocking member according to claim 1, wherein the clearance size between the low-load clamping pawl part and the main body part of the blocking member is equal to or larger than a thickness size of the opening edge portion that is clamped in between the low-load clamping pawl part and the main body part of the blocking member.

3. The structure for attaching the blocking member according to claim 1, wherein:
    the side surface projecting part is formed to draw a line when viewed from the blocking member-side; and
    the low-load clamping pawl part is located closer to a central part of the line than the another clamping pawl part.

4. The structure for attaching the blocking member according to claim 1, wherein:

at least a part of the projecting part is a bottom surface projecting part that projects toward a bottom surface of the blocking member on the attachment object member-side; and when viewed from the blocking member-side, the bottom surface projecting part is disposed to overlap with the blocking member in a case where the blocking member is displaced to any of the insertion position and the fixation position.

5. The structure for attaching the blocking member according to claim 1, wherein:

the blocking member includes a guide part that projects toward a side surface of the opening edge portion; and the guide part is formed in a shape whose projecting amount reduces gradually in a direction in which the blocking member is displaced from the insertion position to the fixation position.

6. The structure for attaching the blocking member according to claim 1, wherein:

the opening is formed in a polygonal shape; and the projecting part is formed along at least two sides of the polygonal shape.

7. The structure for attaching the blocking member according to claim 1, wherein the attachment object member is a case including therein an air passage through which air flows.

\* \* \* \* \*